July 17, 1956
H. J. NICHOLS
2,755,460
ELECTRICAL PULSE TRANSMITTER
Original Filed Sept. 26, 1945
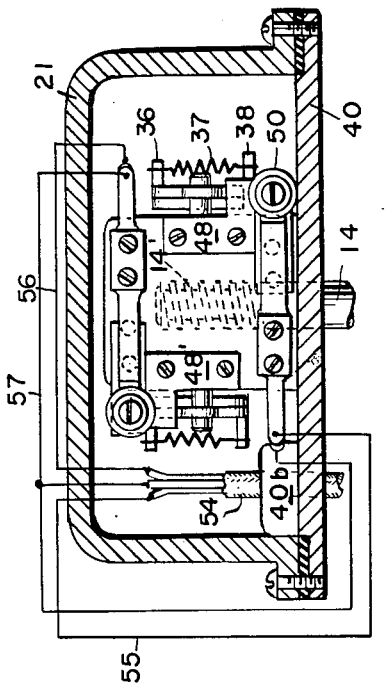
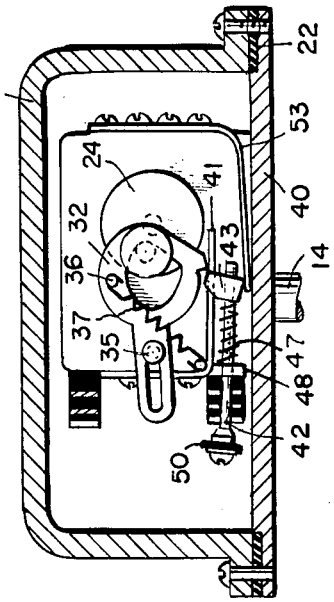
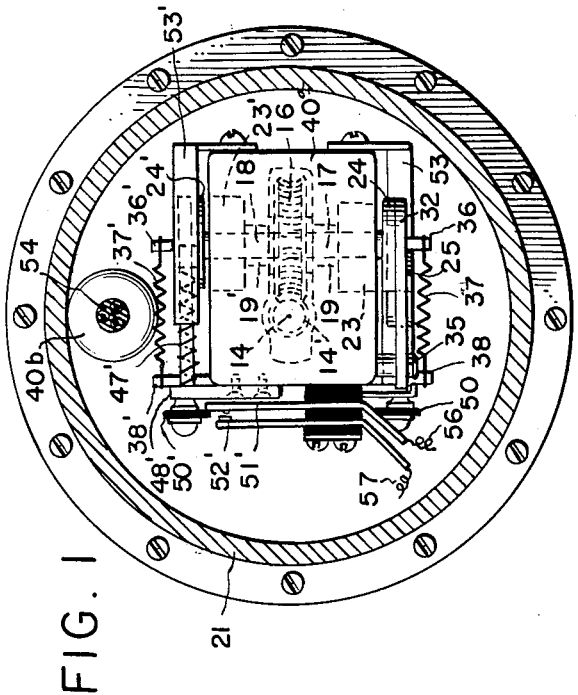
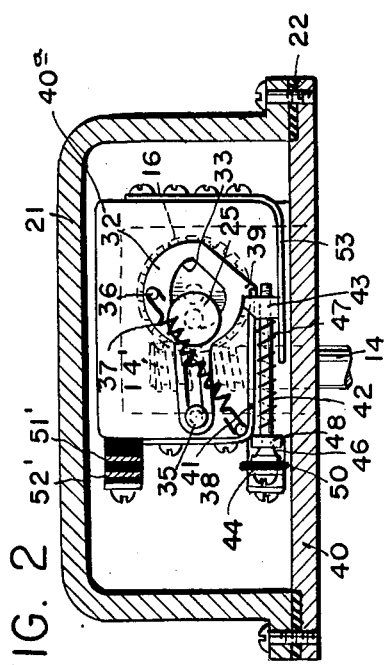
INVENTOR
HARRY J. NICHOLS
BY *J Harold Kilcoyne*
ATTORNEY united States Patent Office 2,755,460
Patented July 17, 1956

2,755,460

ELECTRICAL PULSE TRANSMITTER

Harry J. Nichols, Point Pleasant, N. J., assignor to International Business Machines Corporation, New York, N. Y., a corporation of New York Original application September 26, 1945, Serial No. 618,643. Divided and this application September 4, 1951, Serial No. 244,991

5 Claims. (Cl. 340—359)

This invention relates to an electrical pulse transmitter for use in remote control systems of answer-back type, counting apparatus and generally in electrical pulse actuated systems and apparatus.

This application is a division of my application Serial No. 618,643, filed September 26, 1945, which issued as U. S. Letters Patent No. 2,575,357, dated November 20, 1951.

In remote control systems wherein a precise indication at the control station of the position of the controlled element is required, and in electrical revolution-counter systems wherein the differential count of the rotations of a reversible rotary element, say a shaft, is required, a cardinal requirement to insure reliability and continued accuracy is that the electrical pulse transmitter at the controlled element produce pulses which infallibly represent a certain direction and degree of movement of the controlled element. Heretofore, various devices, including starwheel contactors and pole-changers, have been used to actuate control circuits so as to produce control pulses, but such devices have in practice been found to cause fugitive errors which in time accumulate to impair the accuracy of the control systems.

It is therefore a major object of the present invention to overcome the defects and disadvantages of the prior art by providing an electrical pulse transmitter characterized by inherent reliability, certainty of action and permanent accuracy, whereby each transmitted pulse represents invariably a certain direction and degree of rotation of a rotary driving element.

Another object is to provide an electrical pulse transmitter adapted to send discrete electrical pulses representing the differential rotations of a reversible rotary element with absolute accuracy irrespective of operating conditions, that is, without cumulative errors during repeated reversals, sudden accelerations, switching operations, shut downs, etc.

Yet another object is to provide an electrical pulse transmitter which will infallibly produce uniform actuating pulses whose duration is substantially independent of the rotary speed of the operating shaft within the normal speed range.

Other objects and advantages of the invention will be pointed out in the following description and illustrated in the accompanying drawings which disclose, by way of example, a preferred form of apparatus and one mode of operation in putting the teaching of the invention into effect.

In the drawings:

Fig. 1 is an internal plan view of the pulse transmitter disclosing the mechanism therein, the cover being shown in transverse section.

Fig. 2 is a front view of the interior of the same transmitter, the cover there being in medium section.

Fig. 3 is a view similar to that of Fig. 2 but illustrates a following stage of operation.

Fig. 4 is a left side view of the interior of the transmitter with particular reference to the electrical details.

Referring now to Fig. 1, that figure shows in transverse section details of mechanism of the electrical pulse transmitter 13, in which the worm portion of drive shaft 14 is shown in transverse outline in the center of that figure. Worm 14 drives worm gear 16 of the transmitter at a suitable reduced speed ratio, here assumed to be 10:1, to suit the desired over-all angle reduction ratio or scale factors of the angle indicating system.

Referring now to Figs. 1 to 4 inclusive, the main structural members of the transmitter comprise the base 40, having an internal well 40a adapted to receive worm 14 and worm gear 16, and a closed cover 21 which is assembled tightly to the base by clamp flanges and screws as shown, a gasket 22 being clamped between the flanges to provide an air-tight and oil-tight joint. Worm gear 16 is provided with a hub in which two similar crank shafts 17, 18 are secured tightly by means of a press fit, as shown. The mechanism driven by the two shafts are identical, hence to simplify the description the parts associated with shaft 18 are designated by prime numbers corresponding to similar parts associated with shaft 17. Shafts 17, 18 are rotatably mounted in the walls of well 40a in base 40 by sleeve bearings 19, 19' and passage of oil along the shafts beyond bearings 19, 19' is prevented by oil seals 23, 23' of any desired type, these parts being of commercial type and hence are shown only in outline. On the out-board end of each shaft is mounted a crank disc 24 having a short, flat-headed crank pin 25. An oscillatory member 32, termed the banjo, of banjo form and having a slotted arm and a central sector-shaped opening, or internal cam 33, is pivotally and slidably mounted on a fixed pivot 35 by a screw as shown, and moves flat against crank disc 24 in operative relation with crank pin 25, the construction being such that when shafts 17, 18 rotate the interaction of crank pin 25 and internal cam 33 produces a combined oscillatory and reciprocating motion of banjo 32, this motion being further modified by a tractile spring and trip device as described hereinafter.

A spring support pin 36 is mounted near the rim of the circular portion of banjo 32, and a spring anchor pin 38 is fixed in a suitable position on the base, while therebetween is stretched a tractile spring 37, termed the pawl spring, whose combined function is to provide a limited degree of control to the motion of the banjo and also to provide a resilient propelling force to actuate the spring-loaded trip device as hereinafter explained.

Banjo 32 is provided with a peripheral finger 39, termed the pawl, adapted to engage a fixed, slotted sear member 41 mounted on the base for purposes presently to be explained. A bolt 42, having a follower member or trigger 43 in the form of a special nut assembled on the end of the bolt, is mounted through a hole in stationary plate 48 secured to base 40 and is provided with a slotted head 44 on which a washer insulator 50 is mounted by tight collar 46. A light compression spring 47, termed the bolt spring, is assembled over the stem of bolt 42 between the trigger 43 and plate 48. A spring finger 53 flexibly retains trigger 43 in contact with sear member 41. A pair of normally open, self-closing spring contacts are mounted on base 40, but insulated therefrom, in position to be acted upon by insulator 50; resilient tongue 51 being the movable member of the pair, while back contact 52 is the stationary member of the pair. Normally, washer 50 presses against tongue 51 to hold the contacts open, but when washer 50 is thrust away by the trigger device, the contacts are closed by the resilience of tongue 51.

The mechanism just described, which is mounted on three sides of the exterior of the well portion of base 40, is duplicated for operation by shaft 18. It is to be noted, however, that banjo 32' is assembled in inverted relation to banjo 32, hence operates in reverse manner to banjo 32.

Referring again to Figs. 1 and 4, the base 40 is formed with an internal boss 40b to provide entrance for a three conductor cable 54, a suitable packing and packing nut also being provided to furnish an air-tight entrance seal for the cable, as indicated. Two of the cable conductors, designated by 55 and 56, are connected with the tongues 51 and 51' respectively, while the third conductor 57 is connected to back contacts 52 and 52' in common, these connections being merely indicated for clarity.

Referring now particularly to Figs. 2 and 3, the operation of the electrical transmitter mechanism is as follows: Assuming that crank disc 24 is rotating clock-wise, and has previously rotated to bring the banjo 32 into the position shown in Fig. 2, the pawl 39 is caught on the end of slotted sear 41 and is also in engagement with the trigger 43 carried by bolt 42, the toe of which trigger rides in the slot of sear 41. Further, that tractile spring 37 is stronger than compression spring 47 at all stages of operation. Then as shaft 17 continues in rotation clockwise, crank pin 25 engages the top arc of internal cam 33, thereby lifting the body of banjo 32 upwardly. As this lifting motion continues, pawl 39 is lifted clear of sear 41, but not of trigger 43. Thereupon spring 37 pulls the banjo to the left, pushing trigger 43 to the left along the bottom of sear 41, and thrusting bolt 42 to the left (see Fig. 3) whereupon insulator washer 50 relaxes its pressure on tongue 51, enabling the contacts to close, thereby closing the associated external electrical circuit to send an electrical impulse.

Referring particularly to Fig. 3, near the end of the stroke of pawl 39, the slanting surface of the toe of trigger 43 intercepts the downwardly sloping end of the slot in sear 41, thereby unlatching the trigger from the pawl. (Fig. 3 is drawn to show the instant of unlatching the trigger from the pawl.) Thereupon, compression spring 37 gains control of the bolt and snaps it bodily to the right, returning washer 50 into restraining engagement with tongue 51 and breaking the electrical circuit at the contacts, thereby terminating the electrical pulse.

It will be noted that the circuit closing and opening procedure described will take place whenever the trip device has been cocked and the pawl is tripped from the sear, even if the shaft should stop at that precise instant; hence a pulse would be sent and the circuit again broken under those circumstances. This feature ensures an open line condition regardless of any rest position of the rotor of motor 15, and eliminates any possibility of damage to the magnet windings due to abnormally prolonged current, such as might occur in the absence of this feature. It is also to be noted that the duration of the pulse is not a function of the shaft speed, but of the relative spring forces and masses of the banjo and bolt. It will be evident that by properly balancing these forces and masses to establish the desired pulse duration when the motor is running at full speed, substantially the same duration will be obtained at all lesser motor speeds. This gains the important operational feature of providing operating pulses whose duration is independent of the motor speed, thereby promoting operating uniformity and reliability. It is to be further noted that the contacts are actuated with a snap action, which is an important factor in reducing arcing and securing long contact life. The trip device also eliminates bouncing contacts and enables precious metal contacts to be used economically, thereby promoting economy in first cost and maintenance, and long trouble free operating life.

As shaft 17 continues in rotation clock-wise from the position shown in Fig. 3, the crank pin 25 picks up the banjo 32 and lifts its head upwardly, then to the right, and then downwardly, thereby restoring the pawl to the position shown in Fig. 2, and at the same time recocking the trip device. After the trip device is recocked, an idle interval occurs, during which the crank pin first travels down the sloping surface of the internal cam, pulling the pawl slightly beyond the sear end and enabling trigger 43 to settle firmly in engagement with the pawl (ensuring certain recocking of the trip device); after which the crank pin moves freely along the third quadrant arc of the cam until striking the top arc of the cam to trip the pawl as described. It will be noted that the wear on the crank pin due to sliding action on the cam is well distributed, and that the cam engagements are gradual, thus promoting a long operating life—which it will be appreciated is a highly important practical consideration in apparatus of this class.

Similar step-by-step analysis will show that should the shaft 17 be assumed to rotate in reverse (counterclockwise) the trip device will not be operated; for in that case the crank pin will lift the pawl upwardly and to the right away from the sear and trigger, and will deposit the pawl in the position shown in Fig. 3 without tripping the trigger. Should counterclockwise rotation continue, the trigger will be oscillated against the spring finger 53 when the pawl passes over the trigger, but this oscillation has no component tending to release the tongue 51 from restraint by washer 50. Hence it is apparent that the trip device is operable only for one direction of rotation of the actuating shaft, and can only be operated once for each complete rotation of that shaft in the proper direction. Each device described thus generates pulses which infallibly represent complete revolutions in one direction of the actuating shaft. It follows that there can be no accumulation of fractions of revolutions, no matter how often the rotation is reversed. Further, that no false pulses can be produced when the current supply is shut off and switched on. This eliminates a troublesome source of cumulative and fugitive calibration errors to which some angle indicating systems have been subject. Since the banjo and other operating elements of the trip mechanism associated with shaft 18 are assembled in inverse relation to that shaft, it follows that the pulses generated by that part of the mechanism will represent the counterclockwise revolutions of the worm shaft and the motor rotor, and ultimately, a reverse change as compared to that registered by shaft 17. The pulses generated by the two trip mechanisms can therefore be utilized by a suitable differential pulse counter, for example, to represent continuously the status of the rotations of shaft 17.

Without further analysis the foregoing will so fully reveal the gist of this invention that others can, by applying current knowledge, readily adapt it for various applications without omitting certain features that, from the standpoint of the prior art, fairly constitute essential features of the generic or specific aspects of the invention, and therefore such adaptations and applications, should and are intended to be comprehended within the meaning and range of equivalency of the following claims.

I claim:

1. An electrical pulse transmitter for producing discrete electrical control pulses comprising, in combination, a reversible rotary driving crank shaft, a pair of trip devices, means operatively connecting said trip devices to said crank shaft in such manner that said devices are selectively tripped only according to the direction of the preceding whole revolution of said crank shaft, and means for transmitting a discrete electrical pulse upon tripping of either of said trip devices; whereby each transmitted electrical pulse represents the completion of a whole revolution of said crank shaft in one direction or the other.

2. A mechanical trip device operationally responsive to driving rotation for an entire revolution in one direction only comprising, a driving rotary crank member, a pivotally and slidably mounted oscillatory member adapted to be oscillated and longitudinally translated by said crank member and having an internal cam adapted to coact with said crank member and an external pawl member, a tractile spring acting to bias the movement of said oscillatory member, a stationary sear member mounted to intercept said pawl member at one cyclic position, and a spring biased driven member adapted to be acted upon by said pawl member and to coact with said sear member, thereby to produce one uniform reciprocating stroke per revolution of said crank member independently of the rate of rotation of said crank member below a certain maximum rate of rotation.

3. An electrical pulse transmitter for use in a remote control system comprising, in combination, a reversible rotary driving crank shaft, a pair of trip devices, means operatively connecting said crank shaft to said trip devices in such manner that one of said devices is tripped only by a complete revolution of said shaft in one direction, and the other of said devices is tripped only by a complete revolution of said shaft in the opposite direction, and means for transmitting a single discrete electrical pulse upon the tripping of each said device, whereby each pulse represents the completion of one revolution of said shaft in one or the other direction.

4. An electrical control pulse transmitter comprising, in combination, a reversible rotary driving crank shaft, a pair of one way trip devices for transmitting discrete uniform electrical control pulses and means for operatively connecting said driving member and said devices so that each of said pulses represents the completion of a predetermined degree of rotation of said crank shaft.

5. An electrical pulse transmitter adapted for actuating an angle indicating instrument comprising, in combination a rotary driving crank shaft adapted to be rotated in either direction by a controlled element whose angle is to be indicated and a pair of trigger actuated devices, means for connecting one of said trip devices to the crank shaft for actuation thereby only whenever said crank shaft has completed a whole revolution in one direction, means for connecting the other of said trip devices to the crank shaft for actuation thereby only whenever said crank shaft has completed a whole revolution in the opposite direction, and means operatively associated with each of said trip devices for transmitting a discrete pulse responsively to the actuation thereof; whereby each transmitted pulse represents exclusively the completion of another revolution of said crank shaft in a certain direction.

References Cited in the file of this patent

UNITED STATES PATENTS

| | | |
|---|---|---|
| 284,816 | Campen | Sept. 11, 1883 |
| 475,066 | Ricketson | May 17, 1892 |